(12) United States Patent
Suggs, Sr.

(10) Patent No.: US 10,595,509 B2
(45) Date of Patent: Mar. 24, 2020

(54) CUTTING HORSE TRAINER

(76) Inventor: Danny Suggs, Sr., Greenville, TX (US)

( * ) Notice: Subject to any disclaimer, the term of this patent is extended or adjusted under 35 U.S.C. 154(b) by 289 days.

(21) Appl. No.: 12/034,075

(22) Filed: Feb. 20, 2008

(65) Prior Publication Data

US 2008/0289585 A1 Nov. 27, 2008

Related U.S. Application Data

(60) Provisional application No. 60/890,925, filed on Feb. 21, 2007.

(51) Int. Cl.
*A01K 15/02* (2006.01)

(52) U.S. Cl.
CPC .................. *A01K 15/027* (2013.01)

(58) Field of Classification Search
CPC .................................................. A01K 15/027
USPC .................. 119/839; 273/359, 339, 338, 369
See application file for complete search history.

(56) References Cited

U.S. PATENT DOCUMENTS

| | | | |
|---|---|---|---|
| 2,793,038 A * | 5/1957 | Wallace | F41J 9/02 |
| | | | 273/369 |
| 2,819,900 A * | 1/1958 | Harvey | A63G 19/20 |
| | | | 273/366 |
| 3,303,821 A | 2/1967 | Harris | |
| 3,324,832 A | 6/1967 | McCain | |
| 3,962,995 A | 6/1976 | Brinson | |
| 4,286,788 A | 9/1981 | Simington | |
| 4,495,893 A | 1/1985 | Genelin | |
| 4,601,261 A | 7/1986 | Genelin | |
| 4,738,223 A | 4/1988 | Andreasen | |
| 4,874,179 A * | 10/1989 | Henderson | A63B 69/0068 |
| | | | 273/338 |
| 5,255,629 A | 10/1993 | Paterson | |
| 5,286,032 A * | 2/1994 | Spencer | A63B 69/0068 |
| | | | 273/339 |
| 5,325,817 A | 7/1994 | Huffman | |
| 5,568,927 A * | 10/1996 | Badorrek | F41J 3/0004 |
| | | | 119/839 |
| 5,709,386 A * | 1/1998 | Nelson | A63B 69/0068 |
| | | | 273/338 |
| 2004/0101811 A1 * | 5/2004 | Gipson | A63B 69/0068 |
| | | | 434/247 |

OTHER PUBLICATIONS

Cuttin' Critter Advertisement, Cutting Horse Chatter, Dec. 2001, p. 415.

* cited by examiner

*Primary Examiner* — Monica L Williams
(74) *Attorney, Agent, or Firm* — Mark W Handley; Handley Law Firm, PLLC

(57) ABSTRACT

A cutting horse trainer uses a transport device which rides on a rail of the fence of a pen. The transport device can be positioned behind the fence of a pen. The transport device is moved along the rail responsive to commands from a handheld remote control device. A pulley engaged with the rail is linked to an artificial calf, which is extended into the pen via a hinged arm. As the transport unit moves along the rail, the pulley coupled to the rail causes the artificial calf to rotate accordingly. Thus, during changes in direction, the calf appears to be turning, from the viewpoint of the cutting horse. When not in use, the arm can be folded upwards to remove any apparatus associated with the cutting horse trainer from the pen.

20 Claims, 6 Drawing Sheets

CUTTING HORSE TRAINER

CROSS-REFERENCE TO RELATED APPLICATIONS

This application claims the benefit of the filing date of provisional application U.S. Ser. No. 60/890,925, filed Feb. 21, 2007, entitled "CUTTING HORSE TRAINER", which is incorporated by reference herein.

STATEMENT OF FEDERALLY SPONSORED RESEARCH OR DEVELOPMENT

Not Applicable

BACKGROUND OF THE INVENTION

1. Technical Field

This invention relates in general to animal training devices and, more particularly, to a cutting horse training device.

2. Description of the Related Art

Traditionally, a cutting horse is used in cattle herding to separate individual calves from a herd of cattle. While cutting horses are still used in actual cattle operations, cutting horse competitions have become extremely popular and have driven up the value for trained cutting horses. In fact, horse cutting is now one the fastest growing equine sports in the world.

In a cutting competition, the horse and rider are judged on their ability to separate a calf away from a cattle herd. Once the calf has been separated from the herd, the rider loosens the reins to allow the horse to keep the calf separated from the herd without prompting by the rider.

A horse will not naturally isolate the calf without instructions from the rider. To perform this feat, the horse needs many hours of training. One way to train the horse is to use a live calf. In time, however, the calf will learn to ignore the horse; at this point, a new calf must be used. The expense of replacing calves can become prohibitive, since the cutting training is not only intensive, but it must be repeated periodically to keep the horse in top shape.

Over the years, several mechanical devices for training cutting horses have been created. Most of these designs are either very expensive or ineffective. Furthermore, several of the designs require a significant amount of equipment to be left in the training pen, taking up valuable space. Further, equipment in the pen can be potentially dangerous for animals in the pen.

Therefore, the need has arisen for a mechanical cutting horse trainer which is relatively inexpensive, space-efficient and effective.

BRIEF SUMMARY OF THE INVENTION

In the present invention, a cutting horse trainer includes a carriage for engaging with a rail of a fence with a motor coupled to the carriage for drawing the transport mechanism along the rail in a selected direction. A simulated calf is coupled to the carriage mechanism, wherein the orientation of the calf is dependent upon the selected direction.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-6 of the drawings, like numerals being used for like elements of the various drawings.

Figure 1:
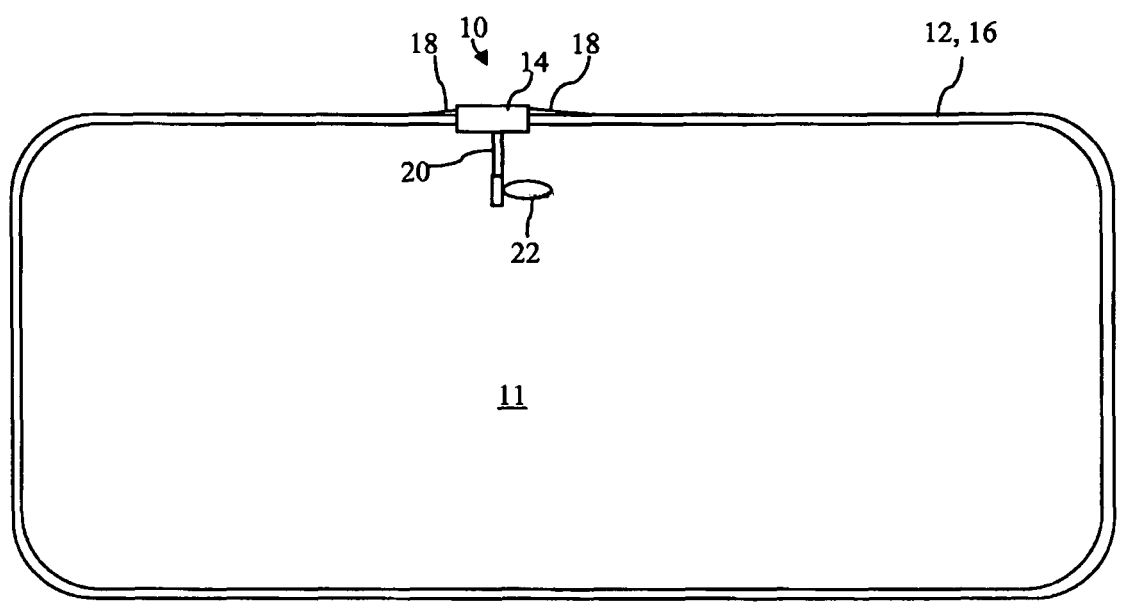
FIG. 1 illustrates a top view of a mechanical cutting horse trainer within a pen.

FIG. 1 illustrates a top view of a mechanical cutting horse trainer 10 for use in a pen 11 defined by an existing fence 12 with a rail. The rail 16 of fence 12 is typically formed of 2" or 2⅜" pipe. In use, the cutting horse trainer 10 is attached to the rail such that it is disposed primarily on the side of fence 12 on the outside of the pen, with a minimal amount of the hardware on the inside of the pen. A transport device 14 rides along rail 16. The transport device 14 propels itself using cord 18. Extension arm 20 extends into the interior of the pen and is connected to simulated calf 19. The arm 20 can be folded upward to remove the device entirely from areas inside of the pen where an animal could come in contact with the trainer.

In operation, the rider controls the movement of transport device 14 along the fence 12 using a handheld remote control transmitter. The remote control transmitter instructs the transport device 14 to move along rail 16 in one direction or the other. The simulated calf 19 will rotate about arm 20 depending upon the direction of travel.

The cutting horse trainer 10 can be used on any conventional fence 12. While the transport unit 14 is shown on a straight rail 16 in FIG. 1, the rail 16 could be straight or curved, and could extend around the entire pen 11. In order for the cutting horse trainer 10 to ride along the entire fence 12, the pen must be round, or the corners must be curved. The transport device 14 could be powered in a variety of ways, including a wired electrical connection, battery, solar power or fuel.

Figure 2:
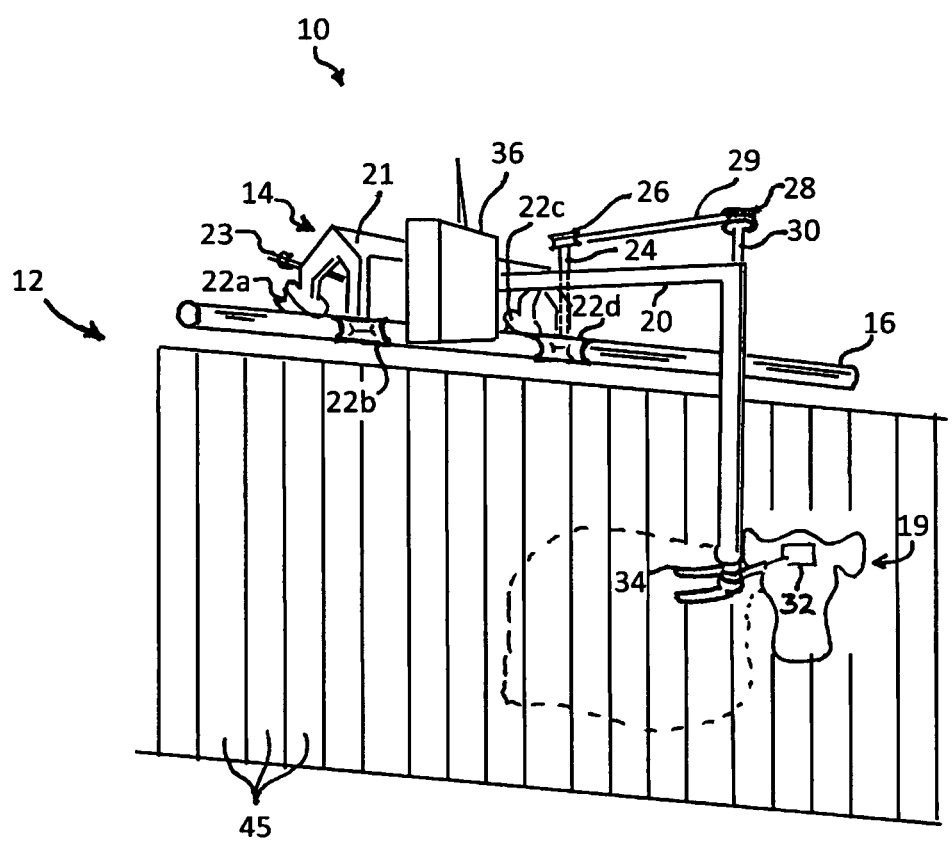
FIG. 2 illustrates a perspective view of the cutting horse trainer shown from inside the pen.

FIG. 2 illustrates operation of the cutting horse trainer 10 shown from inside the pen 11. Transport device 14 includes a carriage frame 21 which includes two sets of pulleys 22 (individually referenced as a pulleys 22a-d). Pairs of pulleys 22 are held tightly against the rail 16 by spring members 23. Pulley 22d connects with rod 24 which is connected to pulley 26. Hence, as transport device 14 travels along rail 16, pulley 22d rotates and thus pulley 26 rotates as well, in a direction corresponding to the direction of travel for the transport device 14. Pulley 26 is coupled to pulley 28 by belt 29. Pulley 28 is connected to rod 30 which is also connected to support arm 32. Support arm 32 is coupled to the back of the head of the simulated calf 19 (for illustration purposes, the body of the calf 19 is shown in phantom). As pulley 26 rotates, pulley 28 also rotates causing support calf arm 32 to rotate as well. Stops 34 prevent support arm 32 from rotating beyond a position parallel to the wall of fence 12. Once support arm 32 engages stops 34, belt 29 will simply slip on pulley 28.

Remote control receiver and control electronics unit 36 is also coupled to support frame 21. Remote control unit 36 receives signals from a handheld device carried by the rider.

The handheld device may be as simple as a two button device; as the rider holds down a left key, the transport unit 14 moves along rail 16 in a left direction and as the rider holds down a right key, the transport unit 14 moves along rail 16 in the right direction. When neither key is pressed, the transport unit 14 remains stationary on rail 16.

Figure 3:
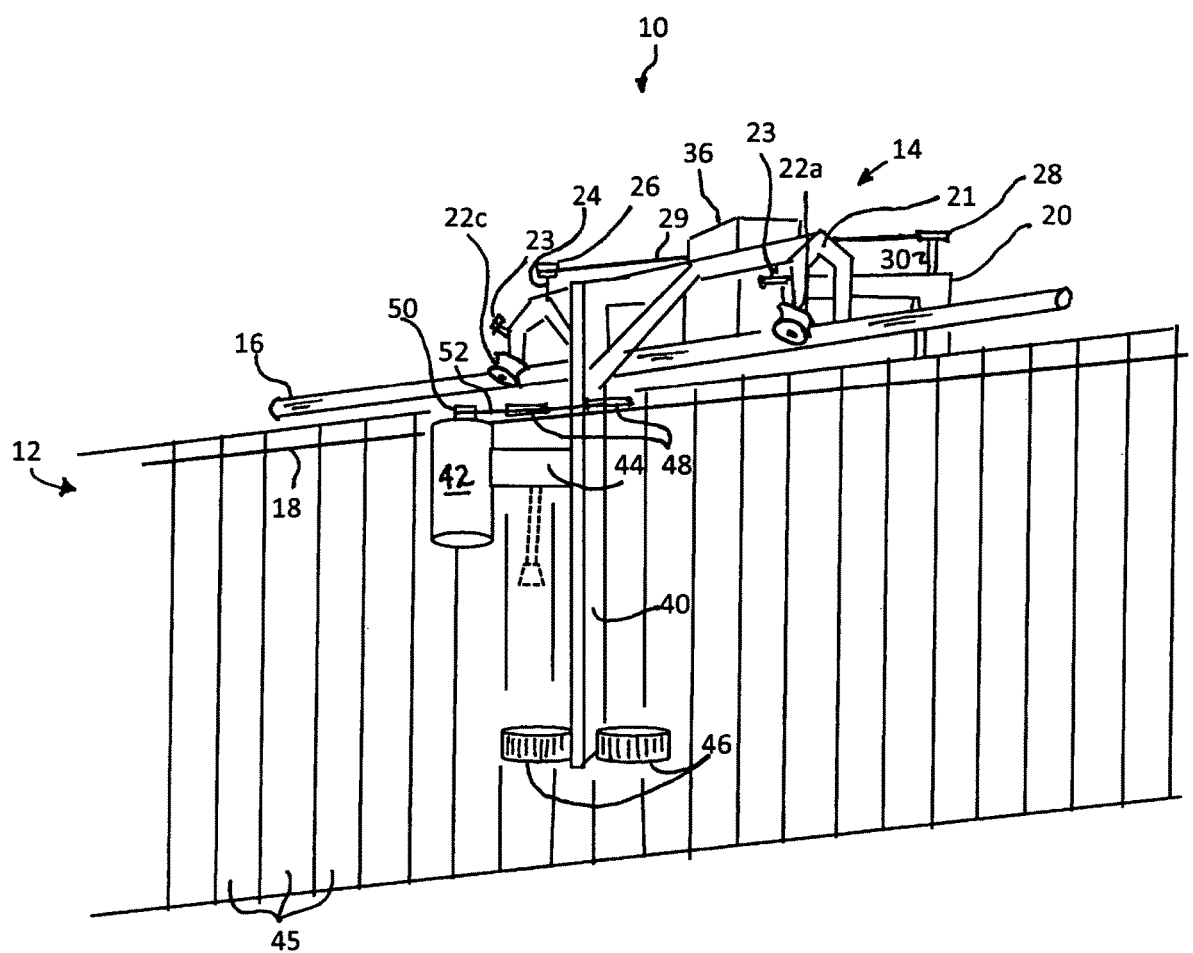
FIG. 3 illustrates a perspective view of the cutting horse trainer shown from outside of the pen.

FIG. 3 illustrates the cutting horse trainer 10 from outside of the pen 11. Back frame 40 is coupled to carriage frame 21 and to motor 42. Motor 42 is coupled to power source 44. Power source 44 provides power in a form suitable to run motor 42. Power source 44 could be, for example, a transformer for converting AC power signals to DC, or it could be, for example, a battery, solar cells or a fuel powered AC/DC voltage generator.

Back frame 40 is also coupled to wheels 46 which support the back frame 40 against the wall (boards) 45 of fence 12.

Cord 18 is coupled to drive pulleys 48 driven by motor 42. Drive pulleys 48 are shown in greater detail in connection with FIGS. 4-6.

In operation, when the rider presses a right or left button on the handheld device, motor 42 rotates a spindle 50 in one direction or the other. The spindle 50 is coupled to one of the drive pulleys 48 which are engaged with cord 18 via belt 52. Accordingly, the transport unit 14 is driven in one direction or the other. When the direction of travel changes, pulley 26 causes the calf support arm 32 to rotate to the opposite side of arm 20.

Figure 4:
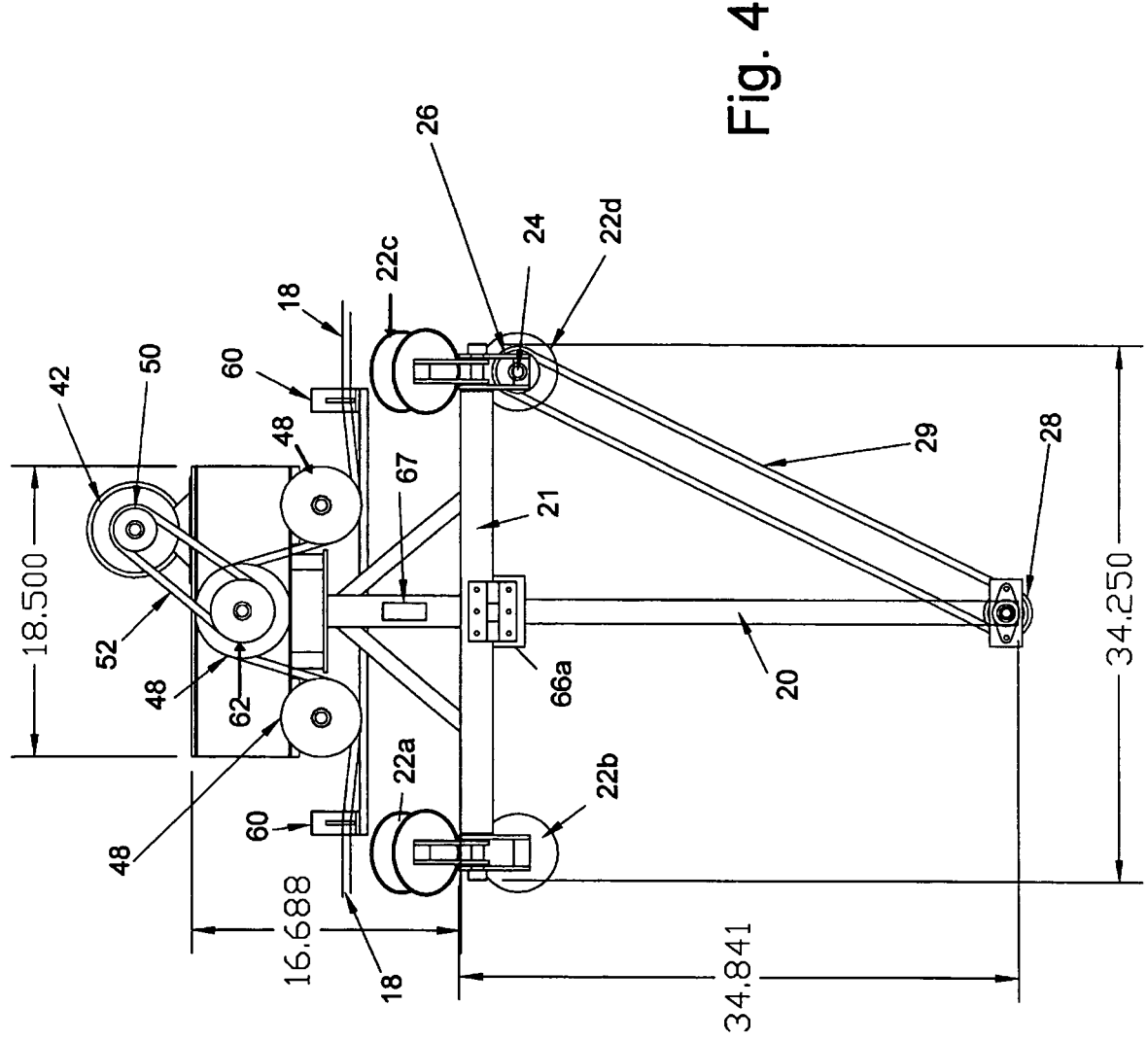
FIGS. 4, 5, and 6 illustrate top, front and rear views of the cutting horse trainer 10, respectively
Figure 5:
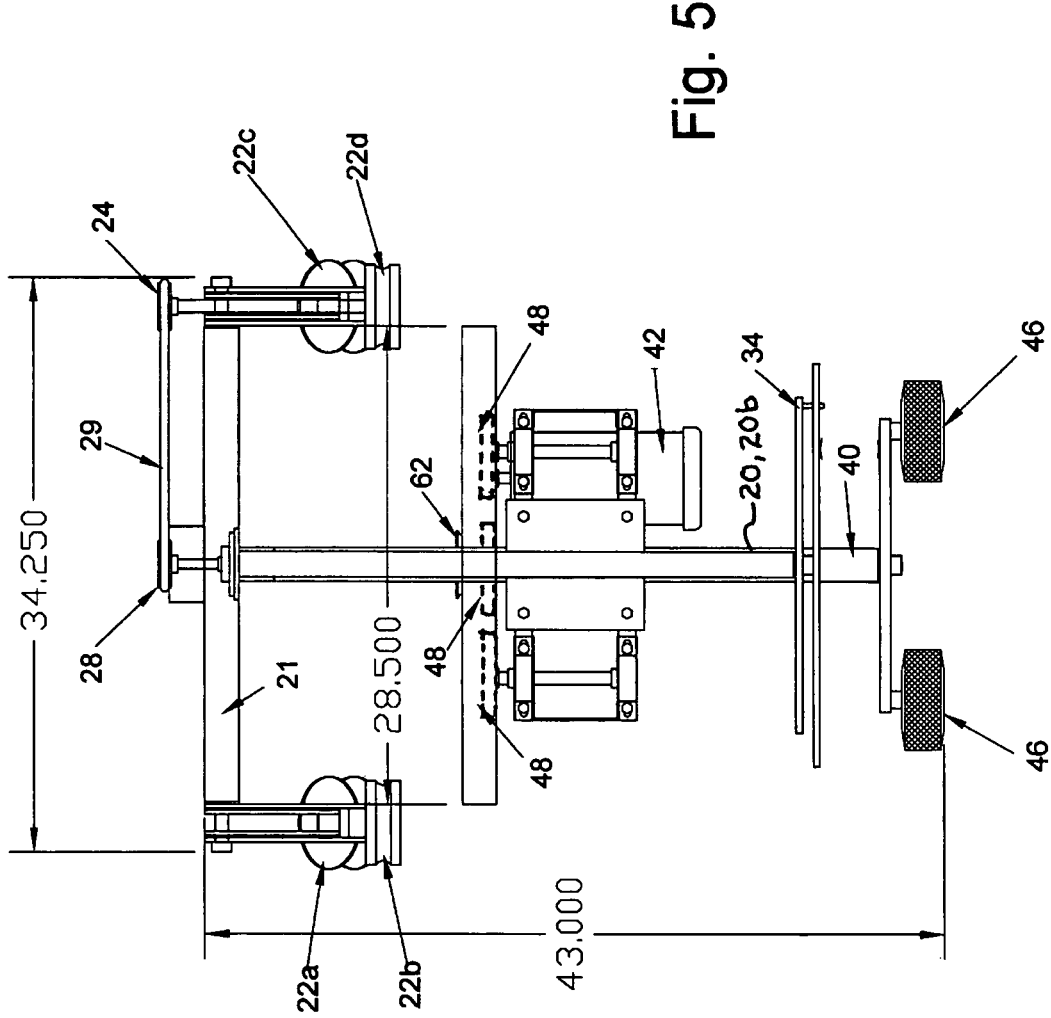
Figure 6:
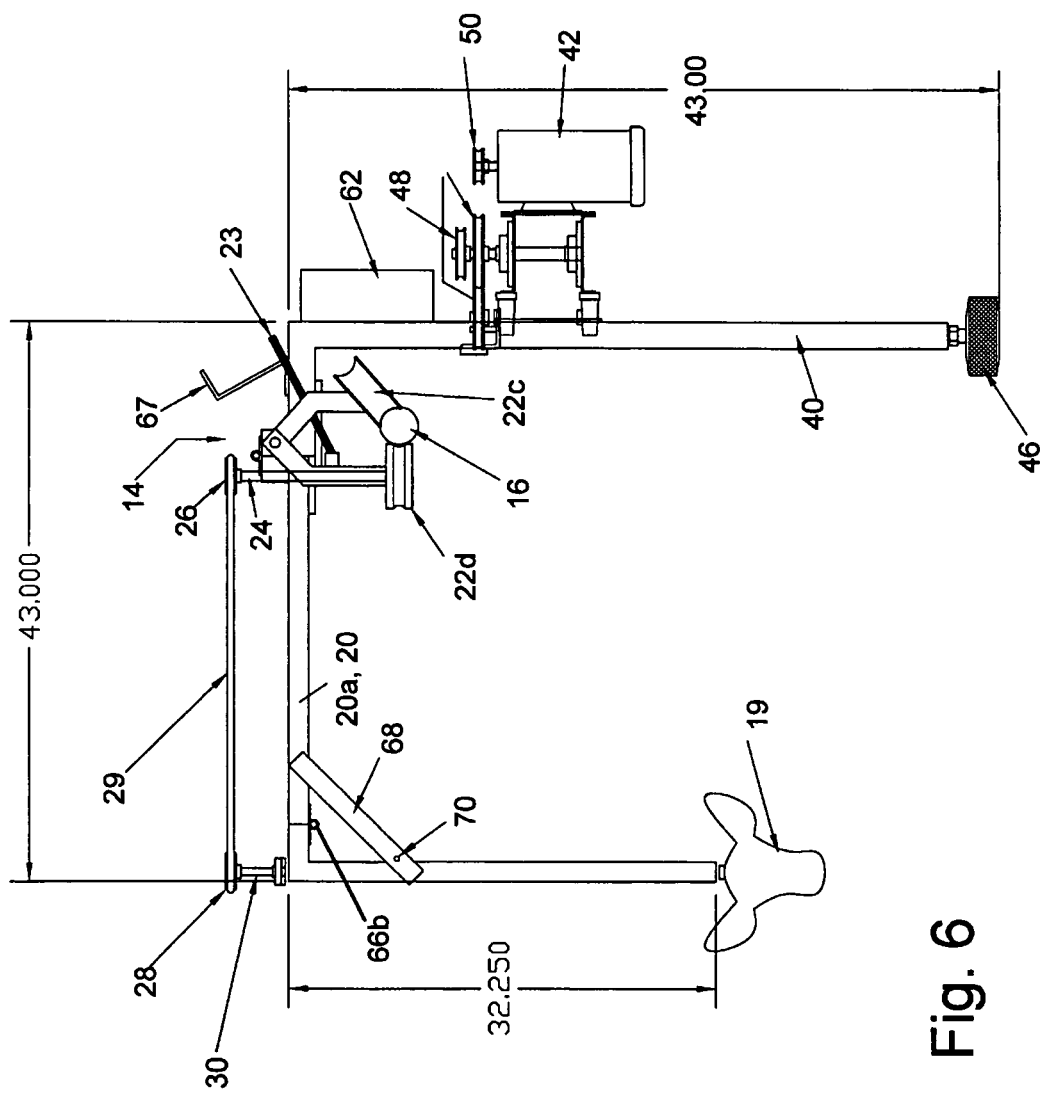

FIGS. 4, 5, and 6 illustrate top, front and rear views of the cutting horse trainer 10, respectively. In particular, FIGS. 4 and 6 show the drive pulleys 48 in greater detail. Cord 18 is disposed through guides 60. Center drive pulley 62 is coupled to spindle 50 of motor 42. As spindle 50 rotates, friction between the drive pulleys 48 and cord 18 cause the transport unit 14 to travel in a direction dictated by the direction of rotation of spindle 50.

As shown in FIGS. 4 and 6, arm 20 is attached to support frame 21 using a hinge 66a. Hinge 66a allows arm 20 to be folded upwards against arm stop 67 while maintaining the connection between pulleys 28 and 26 and belt 29. Further, arm 20 is foldable into two portions 20a and 20b using hinge 66b (see FIG. 6). During operation of the trainer 10, arm portion 20a is folded into a horizontal orientation and gusset 68 and pin 70 hold the arm portion 20b at a right angle to arm portion 20a, so that the simulated calf 19 is inside the pen. When the trainer 10 is not in use, arm portion 20a is folded into a substantially vertical orientation at hinge 66a and arm portion 20b is folded against arm portion 20a (after removal of pin 70), so that it is also in a substantially vertical orientation.

The present invention provides significant advantages over the prior art. First, the cutting horse trainer 10 can be manufactured relatively inexpensively, using only one motor source. The movement of calf 19 is created through movement of the transport device 14 along rail 16. Second, when not in use, arm 20 can be folded upwards, such that no part of the cutting horse trainer 10 is in the pen in a position where it could contact animals. Thus, there is nothing in the pen to take up space or potentially harm an animal in the pen. Third, the track on which the trainer 10 moves is the rail of the fence of a pen, so that no dedicated track is needed.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A cutting horse trainer, comprising:
   a carriage for engaging with a rail of a fence;
   a motor coupled to the carriage for drawing the transport mechanism along the rail in a selected direction;
   a simulated calf coupled to the carriage mechanism, wherein the orientation of the calf is dependent upon the selected direction; and
   wherein the simulated calf is coupled to the carriage by an extension, and wherein the extension is configured to be rotated upwards, such that the simulated calf and extension are positioned away from possible contact with animals in the pen.

2. The cutting horse trainer of claim 1, wherein the motor is coupled to a line attached to the fence.

3. The cutting horse trainer of claim 2 wherein the motor is coupled to a plurality of pulleys, said pulleys engaged with the line, such as when the motor rotates in a first direction, the carriage moves along the rail in a first direction and when the motor rotates in a second direction, the carriage moves along the rail in a second direction.

4. The cutting horse trainer of claim 3 wherein the motor rotates in a first or second direction responsive to a remote control.

5. The cutting horse trainer of claim 1 wherein the carriage is coupled to the rail using a plurality of rotating members for engaging with the rail and for holding the carriage onto the rail.

6. The cutting horse trainer of claim 5 wherein one of the rotating members is coupled to a rod, wherein said rod is coupled to the simulated calf, such as the calf rotates responsive to movement of the one rotating member.

7. The cutting horse trainer of claim 6 and further comprising a stopping mechanism for stopping the simulated calf from rotating beyond predetermined positions.

8. The cutting horse trainer of claim 1 wherein the extension includes one or more hinges.

9. The cutting horse trainer of claim 8 wherein the extension includes two hinges.

10. A cutting horse trainer, comprising:
    a carriage having a plurality of rotating members for engaging with a rail of a fence of a pen, having an interior and an exterior, such that the rotating members rotate as the carriage moves along the rail;
    a motor coupled to the carriage and to a cord disposed on or proximate to the fence, where the carriage moves along the rail in a first direction when the motor rotates in a first angular direction and the carriage moves along the rail in a second direction when the motor rotates in a second angular direction;
    a simulated calf coupled to the carriage by an extending member, wherein the orientation of the calf is dependent upon the selected direction; and
    wherein the extending member folds in a direction away from the interior of the pen.

11. The cutting horse trainer of claim 10 wherein the simulated calf is coupled to a rotatable rod, which rotates responsive to rotation of one of said rotating members.

12. The cutting horse trainer of claim 11 and further comprising a remote control for controlling rotation of the motor.

13. A cutting horse trainer, comprising:
    a carriage having a plurality of rotating members for engaging with a rail of a fence of a pen, having an interior and an exterior, such that the rotating members rotate as said carriage moves along said rail;
    a motor coupled to said carriage and to a cord disposed on or proximate to the fence, where said carriage moves along the rail in a first direction when the motor rotates in a first direction and said carriage moves along the rail in a second direction when said motor rotates in a second direction;

an extension arm coupled to said carriage and extending from said carriage into said pen, wherein said extension arm is adapted for folding in a direction away from the interior of the pen;

a simulated calf disposed in an interior of said pen and coupled to said carriage by said extension arm for moving with said carriage; and wherein when not in use said extension arm is configured to fold in the direction away from the interior of the pen to dispose said simulated calf outside of the pen.

14. The cutting horse trainer of claim 13, further comprising a hinge which pivotally connects said extension arm to said carriage such that said extension arm pivots about said hinge to fold toward said carriage in a direction away from the interior of the pen to dispose said simulated calf outside of the pen.

15. The cutting horse trainer of claim 13, further comprising:

said extension arm having a first arm portion and a second arm portion;

said first arm portion disposed in a horizontal orientation, extending from a first position coupled to said carriage by said hinge to a second position spaced apart from said carriage and said hinge, and disposed above the pen;

a said second arm portion is disposed in a vertical orientation, extending downward from said second position and into said pen for connecting to said simulated calf; and a second hinge pivotally connecting said second arm portion to said first arm portion, such that said second arm portion folds toward said first arm portion in a direction away from the interior of the pen to dispose said simulated calf outside of the pen.

16. The cutting horse trainer of claim 13, wherein said extension arm comprises:

a first arm portion disposed in a horizontal orientation, extending from a first position coupled to said carriage to a second position spaced apart from said carriage and disposed above the pen;

a said second arm portion disposed in a vertical orientation, extending downward from said second position and into said pen for connecting to said simulated calf; and wherein said second arm portion is pivotally connected to said first arm portion such that said second arm portion folds toward said first arm portion in a direction away from the interior of the pen to dispose said simulated calf outside of the pen.

17. The cutting horse trainer of claim 16, wherein said first arm portion is pivotally connected to said carriage such that said first arm portion folds toward said carriage in a direction away from the interior of the pen to dispose said simulated calf outside of the pen.

18. The cutting horse trainer of claim 13, wherein the orientation of the calf is dependent upon the selected direction.

19. The cutting horse trainer of claim 13, wherein said motor is coupled to said carriage for moving with said carriage, and said carriage and motor are easily lifted from the fence once said cord is removed from fence.

20. The cutting horse trainer of claim 13, further including:

a back frame extending downward from said carriage on a side of the fence which is disposed outside of the pen;

wheels mounted to a lower end of said back frame for engaging the fence and providing a counterbalance weight for a weight of said extension arm;

said plurality of rotating member including two sets of pulleys arranged to secure said carriage to the rail of the fence, with each of said sets of a respective spring to pull the pulleys against the rail of the fence;

a third set of pulleys with a pulley belt loosely joining the two pulleys for turning the simulated calf for the direction of travel;

stops extending from said extension arm to limit rotation of said simulated calf; and wherein said motor is coupled to said cord disposed by a plurality of drive pulleys, which comprise three drive pulleys adapted for disposing said cord in a serpentine arrangement, wherein one of said three drive pulleys is directly and coaxially coupled to a center drive pulley coupled to a spindle of said motor via a drive pulley belt.

* * * * *